INVENTORS
DAVID VOO
BY LOUIS L. WINOKUR
ATTORNEY

United States Patent Office 3,616,489
Patented Nov. 2, 1971

3,616,489
METHOD AND APPARATUS FOR MOISTURIZING
SHIRRED CASING STICKS
David Voo, Park Forest, and Louis L. Winokur, Evanston,
Ill., assignors to Union Carbide Corporation
Filed May 10, 1967, Ser. No. 637,537
Int. Cl. A22c 13/00, 11/02; B08b 3/02
U.S. Cl. 17—42           7 Claims

ABSTRACT OF THE DISCLOSURE

Shirred casing sticks are moisturized with water after being shirred but prior to being packaged into cartons for subsequent shipment.

---

This invention relates to moisturizing shirred casing sticks with water. More particularly, this invention relates to moisturizing shirred casing sticks with water after they have been shirred but before they have been packaged into cartons.

Casings, such as cellulose sausage casings, are conventionally fabricated in continuous, tubular lengths and are, thereafter, shirred, compacted and compressed, by various means well known to those skilled in the art, to obtain relatively rigid, shirred casing sticks. Normally, these lengths of shirred casing sticks are made too substantially correspond to the lengths of commercial stuffing tubes which are utilized to stuff food emulsions therein. A typical method of shirring tubular lengths of casing is described in U.S. Pat. 2,984,574 to Matecki.

According to present practices, a continuous, tubular length of cellulose casing, measuring from between about 40 to 80 feet and longer, is typically shirred; that is, has pleats defined about its circumference along its length, then compacted; that is, the pleats are loosely gathered, and finally compressed to obtain a rigid, tubular, casing stick of between about 6 to 14 inches in length. More recently, continuous lengths of tubular casings measuring about 160 feet or more have been shirred, compaced and compressed to obtain rigid tubular casing sticks having compressed lengths of from between about 20–22 inches. In addition, the use of automatic stuffing apparatus has necessitated innovations wherein one end of shirred casing sticks are required to be closed before being packaged into cartons, commonly referred to in the art as caddies, in preparation for subsequent shipment to food packagers who normally stuff them with food emulsions. When ready for use, these shirred casing sticks are removed from the caddies and are fed through automatic hopper feeder means so that the open end of each shirred casing stick is automatically properly positioned on a stuffing tube.

During the shirring operation, the moisture content of tubular casings is generally maintained at a level of from between about 6% to 12% so that a proper shirring pattern and pleats can be obtained therein. At this moisture level, the shirred casing stick is rigid, relatively brittle and readily susceptible to puncture or breakage. When shirred casing sticks are at this moisture level and positioned on a stuffing tube and subsequently stuffed with a food emulsion, a substantial amount of casing breakage results and significant product waste and shut-down time occurs. Hence, prior to use, shirred casing sticks are further humidified; that is, their moisture content is increased in order to render them more pliable and enhance their workability. In order to assure that the thusly moistened shirred casing sticks have attained the degree of pliancy desired for sutffing, the moistened shirred casing sticks are permitted to stand for a period of about 7 days so that they can equilibrate; that is, attain a uniform moisture content throughout their compressed length.

Generally, a properly moistened shirred casing stick will be in an acceptable condition for stuffing with a food emulsion when it has attained a substantially uniform moisture content of from between about 14% to 20%.

Under present methods, it is the general practice to package lengths of shirred casing sticks into caddies before humidifying them; that is, subjecting them to further moisture treatment. Generally, this moisture treatment is acomplished with humidified air to assure that each part of all the shirred casing sticks become moistened. After this additional moisture treatment, the caddies are prepared for shipment and the thusly moistened shirred casing sticks are permitted to equilibrate prior to use.

For example, shirred casing sticks obtained from 84 foot lengths of unshirred, tubular casings are typically humidified by subjecting the shirred casing sticks to humid air having a relative humidity of about 95% and maintained at a temperature of about 100° F. and which is circulated about the casing sticks at a high velocity. Generally, these shirred casing sticks are subjected to these humidification conditions for a period of from between about two to four hours. When shirred casing sticks are obtained from longer lengths of unshirred casings, they are subjected to these humidification conditions for even longer periods of time in order to be properly and satisfactorily humidified.

Shirred casing sticks humidified while packaged in caddies, such as disclosed in U.S. Pat. 2,181,329, exhibit a tendency whereby the end portions of the casing sticks pick up relatively more moisture than the middle portions. This nonuniformity of mositure pick up by the casing sticks requires that they be permitted to equilibrate over longer periods of time before they reach a condition suitable for stuffing. Furthermore, those shirred casing sticks which are tightly compacted to provide handling durability give rise to additional problems since they must be subjected to longer periods of humidification and also tend to exhibit a greater degree of non-uniformity of moisture pick up so that longer periods of equilibration are required before thye can be stuffed.

Other methods and means currently practiced and utilized to further humidify shirred casing sticks are illustrated and disclosed in U.S. Pat. 3,028,952; U.S. Pat. 3,148,992 and U.S. Pat. 3,250,629.

It is an object of the present invention, therefore, to provide a method and apparatus, for moistening shirred casing sticks with water after being shirred but before the thusly moistened shirred casing sticks are packaged for shipment.

This and further objects of the present invention will become more apparent from the following description thereof.

It has now been found that the objects of the present invention can be generally attained by providing an apparatus comprising, in combination, means for positioning and exposing a shirred casing stick to water applicating means, means for contacting the length of said shirred casing stick with water until it is wetted; and, means for removing the thusly wetted, shirred casing stick from the apparatus.

As used throughout this application and in the appended claims, the term "water" is intended to refer to and should be understood as defining that physical state of water wherein it is liquid as opposed to being in a vapor or solid state.

Although the present invention is directed to moisturizing a shirred casing stick primarily with water, it should be understood that other ingredients and additives can be utilized in place of or mixed with the water and applied to the shirred casing sticks by the means and methods described herein. Exemplary of such ingredients and additives are those which improve the peelability characteristic of the casing, enhance the ability of the casing to become wetted, reduce the evaporation rate of moisture from the casing stick when it is exposed to ambient atmospheric conditions during storage or use, promote color and skin formation of meat emulsions encased in the casings, as well as anti-bacterial agents, deodorants, lubricants, stabilizers, plasticizers, and the like.

The manner in which the objects of the present invention can be accomplished will be more clearly understood when considered together with the accompanying drawing, which is set forth as being illustrative thereof and is not intended, in any way, to be limitative thereof, and wherein.

Figure 1:
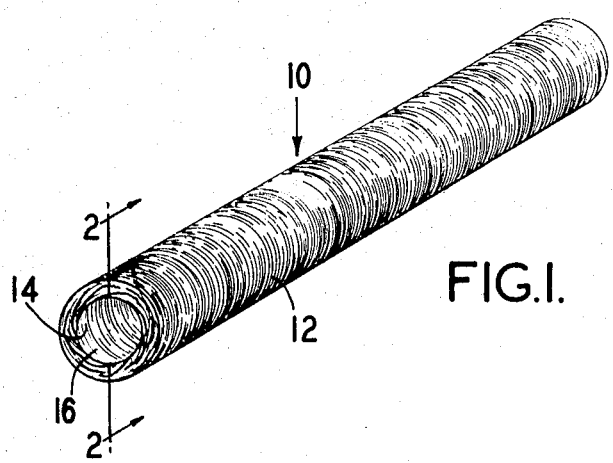
FIG. 1 is an exaggerated isometric view of a shirred casing stick.
Figure 2:
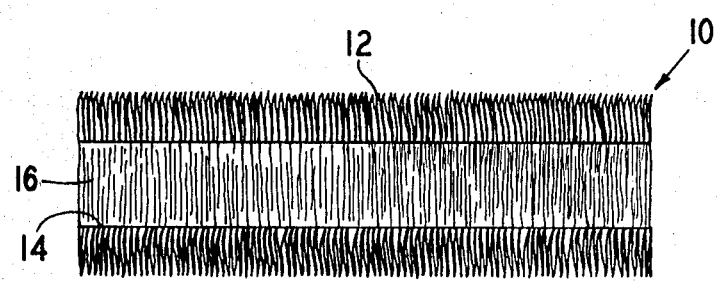
FIG. 2 is a cross-sectional view taken through line 2—2 of the shirred casing stick of FIG. 1.

Turning now to the drawing wherein like reference numerals denote like parts there is shown in FIGS. 1 and 2 a shirred casing stick generally designated by reference numeral 10. Reference numeral 12 identifies the outside circumferential surface while reference numeral 14 identifies the inner surface which defines the bore 16 of the shirred casing stick 10.

In the exaggerated views of the shirred casing stick 10 illustrated in FIGS. 1 and 2, it should be noted that the casing wall comprises a compressed pleat structure wherein the outer circumferential surface 12 of the shirred casing stick 10 contains the outer folds of some of the pleats formed therein while the inner surface 14 contains the inner folds of some of the pleats formed therein and also defines the bore 16 of the shirred casing stick 10. Due to the manner in which tubular lengths of casing are shirred, compacted and compressed, much difficulty has been encountered in attempts to uniformly and thoroughly moisturize the shirred casing stick. It is to this problem that the present invention is directed.

Figure 3:
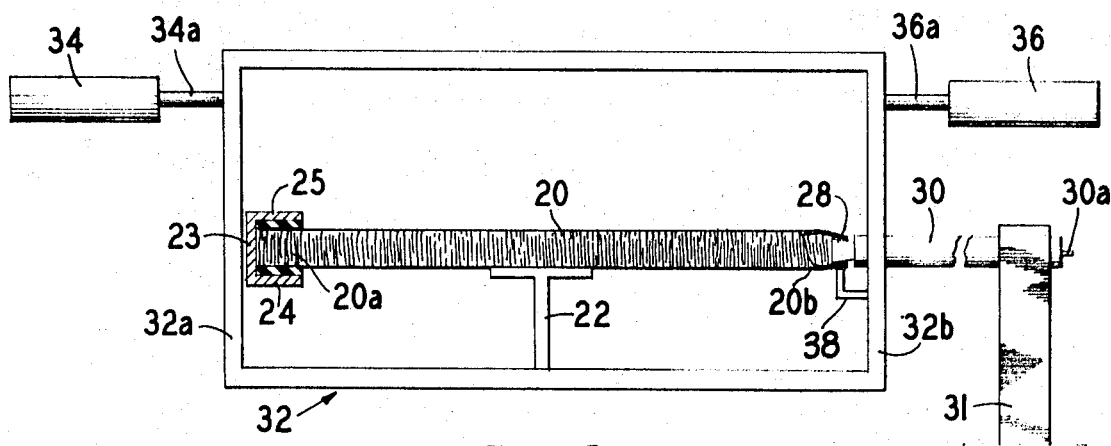
FIG. 3 is a side elevational schematic view, part in section, illustrating one embodiment of the apparatus of the present invention.

In the embodiment of the apparatus of the present invention depicted in FIG. 3, there is shown a length of shirred casing stick 20 having a closed end 20a and an open end 20b. The shirred casing stick 20, after being doffed from the shirring mandrel of a shirring apparatus (not shown), is positioned upon and supported by a transfer and support stand 22.

Stand 22 is fixedly mounted to and forms an integral part of a rectangularly shaped, rigid frame, generally identified by reference numeral 32 having opposing legs 32a, 32b.

Reference numeral 23 denotes a scissor actuated clamping means having two padded jaws 24 and 25 which serve to grip the closed end 20a of the shirred casing stick 20 after it has been positioned on stand 22. Clamping means 23 can be pneumatically energized, regulated and controlled by conventional means (not shown).

Figure 4:
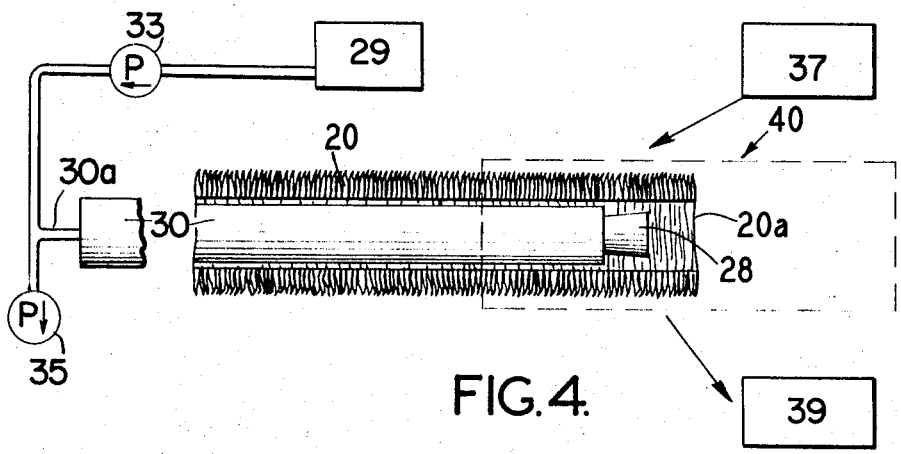
FIG. 4 is a side elevational view, part broken away, part in section and part in phantom, illustrating another embodiment of the apparatus of the present invention.

Adjacent one end of rectangular frame 32 there is horizontally disposed a hollow, tubular mandrel 30 mounted upon a conventional support means 31 and having a conduit 30a at one end leading to a suitable source of water 29, as particularly shown in FIG. 4. Secured to the other end of mandrel 30 is a spray nozzle 28.

A pair of pneumatic cylinders 34 and 36, which can be supported by conventional means, are positioned adjacent each of the legs 32a and 32b of rectangular frame 32. The cylinder rods 34a and 36a of pneumatic cylinders 34 and 36 are each respectively attached to legs 32a and 32b of rectangular frame 32. In this manner, pneumatic cylinders 34 and 36 provide the means by which rectangular frame 32 and stand 22 can be reciprocated toward and away from the spray nozzle 28 and the hollow, tubular mandrel 30. As a result, a shirred casing stick 20 positioned on stand 22 can thusly be conveyed toward spray nozzle 28 and hollow, tubular mandrel 30 so that spray nozzle 28 and hollow, tubular mandrel 30 are inserted into the bore of the shirred casing stick 20. The diameter of the spray nozzle 28 and the diameter of the hollow, tubular mandrel 30 should be at least small enough to enter the bore of the shirred casing stick having the smallest diameter contemplated for use with the apparatus.

In an alternative embodiment of the apparatus depicted in FIG. 3, the clamping means 23 can also be mounted to a gear or belt by conventional means well known to those skilled in the art so that the clamping means 23 can be rotated thereby rotating the shirred casing stick 20 as it is advanced and spray nozzle 28 and hollow, tubular mandrel 30 are inserted therein in order to increase the uniformity of the deposition of the water in the bore of the casing.

In lieu of rotating the shirred casing stick 20 by means of a rotating clamping means 23, a hollow cone spray nozzle, such as that commercially available under the trade name "Whirljet," can be utilized wherein the water being forced therethrough defines a swirling spray pattern as it leaves the nozzle.

In FIG. 4 there is depicted a hollow, tubular mandrel 30 which can be fabricated to be co-extensive with and an integral part of the shirring mandrel of a shirring apparatus or, in fact, be the shirring mandrel of a shirring apparatus. Hollow, tubular mandrel 30 is provided with a spray nozzle 28 at one end and is provided with means connected to a suitable source of water 29, as particularly shown in FIG. 4 at its other end in a manner similar to that described in FIG. 3 above.

As shown in FIG. 4, a shirred casing stick 20 having a closed end 20a is depicted in its relative position on hollow, tubular mandrel 30 as it would be upon being doffed from the shirring mandrel of a shirring apparatus.

In an alternative embodiment, the apparatus shown in FIG. 4 can also be provided with a cylindrical sleeve spray means shown in phantom and generally identified by reference numeral 40.

Figure 5:
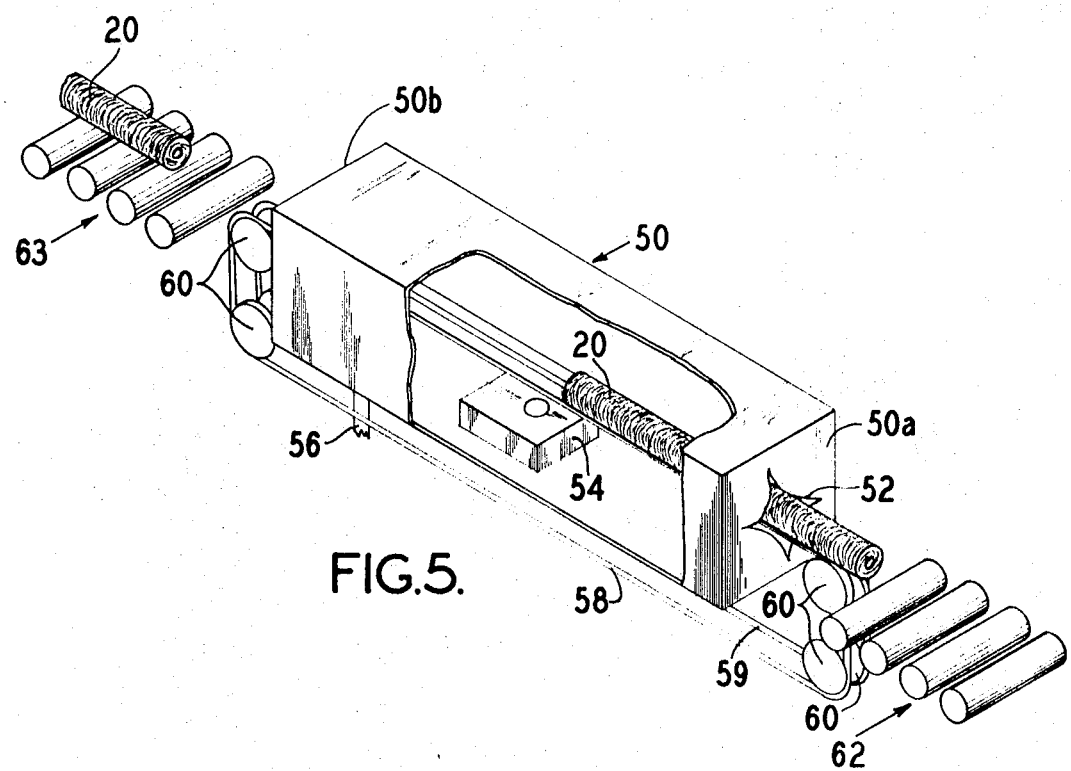
FIG. 5 is a schematic isometric view illustrating a further embodiment of the apparatus of the present invention.

Turning now to the embodiment of the apparatus depicted in FIG. 5, there is shown therein a chamber, generally designated by reference numeral 50. Chamber 50 is preferably fabricated from a suitable synthetic, plastic film in the form of a rectangle and can be supported by conventional means (not shown). Any resin can be utilized to fabricate the plastic film comprising chamber 50 such as polyvinyl chlroides, polyethylenes, polypropylenes, polyesters and the like. Each of the end walls 50a and 50b of chamber 50 can be provided with a plurality of slits 52 in order to readily permit the passage therethrough of shirred casing sticks having varying diameters. In lieu of slits 52, each end wall of chamber 50 can have apertures formed therein of a size sufficient to accommodate the passage therethrough of shirred casing sitcks having varying diameters.

A shirred casing stick 20, after it has been doffed from the shirring mandrel of a shirring apparatus 37, as shown diagrammatically in FIG. 4 and as disclosed in U.S. Pat. 3,110,058, Marbach, can be readily guided to chamber 50 and admitted therein through the slits 52 in one end wall 50a by means of a skewed drive roll means, generally designated by reference numeral 62, over which the shirred casing is axially rotated. Similarly, the shirred casing stick 20 can be subsequently removed from chamber 50 through the slits 52 in end wall 50b by means of a second, skewed drive roll means, generally designated by reference numeral 63.

Within chamber 50 there is provided a mist nozzle 54 equipped with an air blower (not shown). Mist nozzle 54 can be connected to a suitable source of water 29, as particularly shown in FIG. 4 so that water can be transmitted therethrough to and circulated inside of chamber 50.

In order to transport a shirred casing stick 20 through chamber 50, there is provided a pair of spring belts 58, 59, each of which is trained about sheaves 60 and disposed opposite each other. At least one sheave 60 about which each spring belt 58, 59 is trained is a driven sheave actuated and energized by a suitable source of energy such as an electric motor. The sheaves 60 and spring belts 58, 59 are positioned such that the spring belts 58, 59 tangentially and frictionally engage a shirred casing stick 20 as it is guided thereto along skewed roll 62.

At the lower end of chamber 50 and adjacent its outlet end 50b, there can be provided a drain 56 which can be connected to the supply source of water so that the water accumulating in chamber 50 can be permitted to drain off, and be recirculated to the mist nozzle 54 and re-used. Drainage of accumulating water within chamber 50 through drain 56 can be readily accomplished by fabricating chamber 50 so that a trough is formed in the bottom wall thereof which communicates with drain 56 or merely by fabricating chamber 50 so that the bottom wall thereof slopes toward drain 56.

A typical operation of the various embodiments of the apparatus of the present invention will now be described and will be more readily appreciated when considered together with the accompanying drawing with reference first to the embodiment of the apparatus depicted in FIG. 3.

Prior to start up of the shirring apparatus, the support stand 22 is reciprocated away from spray nozzle 28 by means of pneumatic cylinders 34, 36 acting through their cylinder rods 34a, 36a, respectively, in conjunction with legs 32a, 32b of rectangular support frame 32. As shirred casing sticks are doffed from the shirring mandrel of a shirring apparatus, they are placed on the support stand 22 with the open end 20b of the shirred casing stick 20 facing and in ailgnment with the spray nozzle 28. After being thusly positioned on support stand 22, the closed end 20a of the shirred casing stick 20 is secured into position by means of clamp 23 whose padded jaws 24, 25 grip the closed end 20a of the shirred casing stick 20. The amount of pressure exerted on the closed end 20a by the jaws 24, 25 of clamp 23 can be readily regulated either by mechanical means, such as a screw to adjust the distance between co-acting clamp jaws 24, 25 for a shirred casing stick of a particular diameter, or by means of a conventional sensinig plate secured to either one or both of clamping jaws 24, 25.

Next, support stand 22 and rectangular frame 32 are reciprocated toward spray nozzle 28 by means of pneumatic cylinders 34, 36. As the open end 20b of the shirred casing stick 20 approaches the spray nozzle 28, it is guided over and about the spray nozzle 28 and the hollow, tubular mandrel 30. The open end 20b of the shirred casing stick 20 is sheathed over and about spray nozzle 28 in this manner until the closed end 20a abuts the end of spray nozzle 28. At this time, support stand 22 is again reciprocated to withdraw the shirred casing stick 20 from its sheathed relationship with hollow, tubular mandrel 30 and spray nozzle 28. At the moment withdrawal of the shirred casing stick 20 is begun, water, admitted from inlet 30a, is pumped to and through hollow, tubular mandrel 30 to spray nozzle 28. Control and regulation of the quantity and pressure of water admitted to and pumped through hollow, tubular mandrel 30 and spray nozzle 28 can be accomplished by the use of conventional means well known to those skilled in the art. Water is thus continually sprayed from the spray nozzle 28 to contact the inner surface of the shirred casing stick 20 as it is being withdrawn from the hollow, tubular mandrel 30 and the spray nozzle 28.

Withdrawal and spraying of the shirred casing stick 20 continues in this manner until the open end 20b of the shirred casing stick 20 is about to be withdrawn from the spray nozzle 28. By means of a conventional sensing means 38 positioned adjacent the spray nozzle 28 (not shown) the water being pumped by conventional means, such as a pump 33 as depicted in FIG. 4 through hollow, tubular mandrel 30 and spray nozzle 28 is stopped immediately prior to the time the open end 20b clears the spray nozzle 28 and the shirred casing stick 20 is removed therefrom by means 39, as diagrammatically shown in FIG. 4 and as disclosed in U.S. Pat. 3,110,058, Marbach. By this means, moisturizing shirred casing sticks of varying lengths can be readily accommodated.

In a preferred embodiment of the present invention, vacuum is also applied by conventional means, such as a vacuum pump 35 as depicted in FIG. 4 to the spray nozzle 28 as soon as the flow of water therethrough has been stopped in order to prevent any water in the spray nozzle 28 from dripping out while the open end 20b of the shirred casing stick 20 is withdrawn therefrom and before the next shirred casing stick 20 is sheathed over the spray nozzle 28 and the hollow, tubular mandrel 30.

In those instances where both ends of the shirred casing sticks are open, the apparatus depicted in FIG. 3 can be positioned adjacent the end of the shirring mandrel of a shirring apparatus so that, as the shirred casing stick 20 is doffed from the shirring mandrel, it is automatically delivered to and positioned on support stand 22.

As will become obvious to those skilled in the art, the rate and speed at which a shirred casing stick 20 is sheathed over and then withdrawn from the spray nozzle 28 and the hollow, tubular mandrel 30, can be regulated and controlled by regulating and controlling the rate and speed at which rectangular frame 32 and support stand 22 are reciprocated. It will also be obvious to those skilled in the art that the bore of the shirred casing stick 20 can be sprayed with water either as it is sheathed over or withdrawn from the spray nozzle 28 and the hollow, tubular mandrel 30 or as it is both sheathed over and withdrawn therefrom, or during several cycles of being sheathed over and withdrawn therefrom. In this manner, the amount of water sprayed through and on the surface of the bore of the shirred casing stick can be programmed to accommodate the particular shirred casing sticks to be moisturized. For example, for those casing sticks which, due to the manner in which they are shirred, exhibit variations in the compactness of the pleats formed therein, the amount of water transferred to these sticks can be readily regulated and controlled in order to compensate for these variations and, thereby, assure that the casing sticks become uniformly wetted.

In addition to moisturizing shirred casing sticks with the ingredients and additives mentioned hereinabove, moisturizing shirred casing sticks can also be readily accomplished by the use of foams, water containing gases, such as aerated water, and the like.

In lieu of utilizing the spray nozzle 28 and/or the hollow, tubular mandrel 30 illustrated in FIG. 3 other water-releasing elements, such as a sponge, can also be employed as well as cylinders of ice equipped with melt control means to moisturize the shirred casing sticks.

EXAMPLE 1

The apparatus of the present invention depicted in FIG. 3 was utilized to wet and moisturize shirred casing sticks having one open and one closed end and obtained from 84-foot lengths of tubular casing having a diameter of about 1.0 inch. The shirred casings were placed in the apparatus and sheathed over the spray nozzle 28 and the hollow, tubular mandrel 30. As the shirred casings were withdrawn from the spray nozzle 28 and hollow, tubular mandrel 30, water was sprayed onto the surfaces defining the bores of the shirred casings.

A hollow cone spray nozzle having an orifice diameter of 0.020 inch was employed at the end of a hollow, tubular mandrel having a diameter of 0.472 inch. Water was admitted through the hollow, tubular mandrel and through the spray nozzle at a pressure of 50 pounds per square inch. The shirred casings were withdrawn from the spray nozzle and the hollow, tubular mandrel at an average rate of about 3 inches per second. Water was sprayed onto the bores of the shirred casings for a duration of about 4.5 seconds and the flow of water was stopped just prior to complete withdrawal of the shirred casings from the apparatus.

The results from this procedure are set forth in Table I below and are compared with the results obtained from similarly shirred casing sticks which were humidified in accordance with presently utilized commercial methods, such as that disclosed in U.S. Pat. 2,181,329 and which are set forth in Table II below wherein these casings are identified as the "Control Casings."

The moisture content of the outer surface and core of the shirred casings at the open end, closed end and middle portions thereof was determined in both instances by chemical analysis and is expressed in the tables as percent based upon the total weight of the casing sample.

TABLE I

| Moisture content determined— | Moisture content of casings (percent) | | | | | |
|---|---|---|---|---|---|---|
| | Open end | | Middle | | Closed end | |
| | Surface | Core | Surface | Core | Surface | Core |
| Before spraying | 10.5 | 9.4 | 9.4 | 9.4 | 9.4 | 9.4 |
| 1 hour after spraying | 9.5 | 15.2 | 8.6 | 18.8 | 10.4 | 19.8 |
| 24 hours after spraying | 13.3 | 13.0 | 14.9 | 13.6 | 15.2 | 14.1 |

The moisture gained by the casings 24 hours after being sprayed was calculated to be about 6.6 grams per casing stick.

TABLE II

| Moisture content determined— | Moisture content of control casings (percent) | | | | | |
|---|---|---|---|---|---|---|
| | Open end | | Middle | | Closed end | |
| | Surface | Core | Surface | Core | Surface | Core |
| 1 day after humidification | 14.7 | 13.1 | 13.8 | 13.3 | 19.4 | 15.7 |
| 10 days after humidification | 14.0 | 13.4 | 14.8 | 12.8 | 16.3 | 15.0 |

From the results set forth in Tables I and II above, it can be seen that shirred casing sticks can be wetted and moisturized at a substantially faster rate than has been heretofore realized. It is of paramount significance to note that a period of about 24 hours is all that is needed to permit the casings wetted and moisturized in accordance with the present invention to equilibrate and achieve a substantially uniform moisture content from end to end (Table I) as opposed to present, commercially practiced methods wherein a substantially longer period was required to achieve equilibration (Table II).

EXAMPLE 2

A comparative determination was also made of the moisture distribution in shirred casing sticks wetted and moisturized in accordance with the method and apparatus of the present invention and those humidified in accordance with present, commercial methods and the same procedures were followed as set forth in Example 1 above.

The shirred casing sticks were weighed before they were wetted and moisturized or humidified. The moisture gain of the shirred casing sticks wetted and moisturized in accordance with the method and apparatus of the present invention was determined after the wetted and moisturized shirred casing sticks were packaged in and thereafter immediately removed from the caddy. The moisture gain of the shirred casing sticks humidified in accordance with present commercial methods, as referred to in Example 1 above, was determined after these shirred casing sticks had been permitted to equilibrate in the caddy for three days.

The results obtained from these determinations are set forth in Table III below wherein the shirred casing sticks moistened and wetted in accordance with the method and apparatus of the present invention are identified by the term "Wetted and Moisturized Casings," the shirred casing sticks humidified in accordance with the present, commercial method are identified by the term "Humidified Casings," and the moisture gain of each shirred casing stick is expressed in grams. The location of each shirred casing stick packaged in the caddy can be determined by the following diagrammatic char.

Casing stick location in caddy

| Row: | Column | | | | | | | | | |
|---|---|---|---|---|---|---|---|---|---|---|
| A | 1 | 2 | 3 | 4 | 5 | 6 | 7 | 8 | 9 | 10 |
| B | 1 | 2 | 3 | 4 | 5 | 6 | 7 | 8 | 9 | 10 |
| C | 1 | 2 | 3 | 4 | 5 | 6 | 7 | 8 | 9 | 10 |
| D | 1 | 2 | 3 | 4 | 5 | 6 | 7 | 8 | 9 | 10 |
| E | 1 | 2 | 3 | 4 | 5 | 6 | 7 | 8 | 9 | 10 |

From the results tabulated in Table III below it can be seen that even though the overall moisture gained by the wetted and moisturized shirred casings was less than that gained by the humidified shirred casings, they exhibit a higher degree of uniform moisture gain regardless of their location in the caddy.

Significantly, the difference in moisture gain between those wetted and moisturized shirred casings which exhibited the highest moisture gain, such as at caddy locations B7 and D7, and those which exhibited the lowest moisture gain, such as at caddy locations C3, A5, E5, A7,

TABLE III

| Method used | Moisture gain determined | Row | Column | | | | | | | | | |
|---|---|---|---|---|---|---|---|---|---|---|---|---|
| | | | 1 | 2 | 3 | 4 | 5 | 6 | 7 | 8 | 9 | 10 |
| | | | Moisture gain of each casing stick according to location in caddy (grams) | | | | | | | | | |
| Wetted and moisturized casings. | After packaging in and immediate removal from caddy. | A | 6.6 | 6.5 | 6.6 | 6.7 | 6.2 | 6.5 | 6.2 | 6.4 | 6.5 | 6.2 |
| | | B | 6.3 | 6.2 | 6.5 | 6.5 | 6.5 | 6.5 | 6.8 | 6.4 | 6.5 | 6.2 |
| | | C | 6.4 | 6.5 | 6.2 | 6.3 | 6.3 | 6.5 | 6.3 | 6.3 | 6.3 | 6.6 |
| | | D | 6.6 | 6.3 | 6.6 | 6.3 | 6.4 | 6.3 | 6.8 | 6.4 | 6.2 | 6.3 |
| | | E | 6.4 | 6.4 | 6.4 | 6.6 | 6.2 | 6.5 | 6.4 | 6.5 | 6.5 | 6.4 |
| Humidified casings | 3 days after packaging in caddy | A | 6.9 | 6.7 | 6.8 | 6.8 | 6.8 | 6.8 | 6.8 | 6.4 | 6.4 | 6.2 |
| | | B | 7.0 | 7.0 | 6.9 | 7.1 | 7.1 | 7.1 | 7.2 | 7.0 | 7.0 | 6.6 |
| | | C | 7.2 | 7.3 | 7.2 | 7.3 | 7.3 | 7.2 | 7.1 | 7.2 | 7.2 | 6.8 |
| | | D | 7.3 | 7.0 | 7.0 | 7.0 | 6.9 | 7.0 | 7.1 | 7.0 | 7.1 | 6.6 |
| | | E | 7.6 | 7.3 | 7.3 | 7.2 | 7.1 | 7.0 | 7.1 | 7.3 | 7.3 | 6.6 |

D9, A10 and B10, was only 0.6 grams. On the other hand, the difference in moisture gain between those humidified shirred casings which exhibited the highest moisture gain, such as at caddy location E1, and those which exhibited the lowest moisture gain, such as at caddy location A10, was 1.4 grams even after being permitted to equilibrate for three days.

The operation of the embodiment of the apparatus of the present invention depicted in FIG. 4 is generally similar to that described above in connection with the apparatus illustrated in FIG. 3.

As pointed out hereinabove, the hollow, tubular mandrel 30 of the apparatus set forth in FIG. 4 can be the same as or an integral part of the shirring mandrel of a shirring apparatus. Hence, the means utilized to doff a shirred casing stick from the shirring mandrel of a shirring apparatus can also be employed to withdraw and remove the shirred casing stick 20 from the hollow, tubular mandrel 30 and the spray nozzle 28 of the apparatus of FIG. 4.

Similar means as described hereinabove for the apparatus depicted in FIG. 3 can also be utilized for the apparatus illustrated in FIG. 4 to supply water through hollow, tubular mandrel 30 and spray nozzle 28 as the closed end 20a of a shirred casing stick 20 begins to be withdrawn therefrom. In like manner, sensing means can be positioned adjacent the spray nozzle 28 to stop the flow of water therethrough just prior to the time the open end 20b (FIG. 3) of the shirred casing stick is withdrawn. Vacuum means can also be utilized to prevent water from dripping from the spray nozzle 28 after the flow of water has been stopped in a manner similar to that described hereinabove in connection with the apparatus set forth in FIG. 3.

In an alternative embodiment, the apparatus depicted in FIG. 4 can be provided with a cylindrical spray sleeve means 40 through which the shirred casing stick 20 is passed so that the outer surface of the shirred casing stick 20 can also be wetted and moisturized. The cylindrical spray sleeve means 40 can be utilized either in conjunction with the spray nozzle 28 or in lieu thereof so that either both the outer surface and the inner surface or only the inner surface or only the outer surface of the shirred casing stick 20 can be wetted and moisturized.

A typical operation of the embodiment of the apparatus of the present invention depicted in FIG. 5 will now also be described.

The embodiment of the apparatus depicted in FIG. 5 can be aligned with the shirring mandrel of a shirring apparatus and positioned adjacent thereto so that no further adjustment is necessary or required to convey and transfer a shirred casing stick thereto as it is doffed from the shirring mandrel of a shirring apparatus.

Prior to start up, water is pumped by conventional means to and through mist nozzle 54 and into chamber 50 until the entire chamber 50 is clouded with droplets of water thereby forming an atmospheric mist environment in chamber 50. Spring belts 58, 59 are also started through their respectively driven sheaves, so that they each travel in the same direction. The apparatus is now ready to receive a shirred casing stick.

A doffed, shirred casing stick 20 is deposited upon skewed drive roll means 62 and delivered thereby to the slits 52 in end wall 50a of chamber 50. As the forward end of the shirred casing stick 20 approaches the slits 52 in end wall 50a, it is tangentially and frictionally engaged at this point by the pair of driven spring belts 58, 59 to be carried and conveyed thereby to and through the slits 52 and into chamber 50.

The spring belts 58, 59 are preferably of thin diameter and quite flexible in order to accommodate the positioning therebetween of shirred casing sticks of varying diameter. In a preferred embodiment, the sheaves 60 adjacent the slits 52 in each end wall 50a and 50b are mounted on spring-loaded shafts so that they, too, can accommodate the passage therebetween of shirred casing sticks having varying diameters.

As the shirred casing stick 20 is thusly transported through chamber 50, it is passed through and "immersed" in the atmospheric mist environment created therein by mist nozzle 54. In this manner, the entire outer surface as well as the inner surface defining the bore of the shirred casing stick 20 becomes wetted and moistened with the droplets of liquid water.

Removal of the now wetted and moistened shirred casing stick 20 is accomplished in the reverse manner of its entry into the chamber 50. Upon passing through slits 52 in the other end wall 50b of chamber 50 by means of spring belts 58, 59, the shirred casing stick 20 is deposited on skewed drive roll means 63 positioned adjacent thereto and is thereby transported away from chamber 50 to a packaging station.

The length of mist chamber 50 is not critical but should be at least about as long as the shortest shirred casing stick to be admitted therethrough. Similarly, the amount of time a shirred casing stick is exposed to the atmospheric mist environment in chamber 50 is also not critical and can be varied by extending the length of the chamber 50, altering the speed of spring belts 58, 59, and the like.

Although the embodiments of the apparatus depicted in FIGS. 3 and 5 are preferably utilized in line with shirring apparatus, it should be understood that the apparatus can be placed in any convenient location depending upon the production alignment desired or required. In all instances, however, it should be understood that the apparatus of the present invention are employed to wet and moisturize shirred casing sticks after they have been shirred but before they are packaged in caddies. By utilizing the apparatus of the present invention, it can readily be seen that elaborate and bulky humidification means are no longer required and moisturizing and wetting shirred casing sticks can be simply and quickly accomplished in much less space.

By employing the method and apparatus of the present invention, shirred casing sticks can be obtained which are uniformly wetted and moisturized from end to end of each casing stick, from casing stick to casing stick and, ultimately, from one casing caddy to the next.

Although the present invention has been described with particular reference to shirred casing sticks fabricated from cellulose, it should be understood that it is not intended to be nor should it be interpreted as being limited thereto since it can also be utilized with other natural or synthetic hydrophilic materials such as shirred casing sticks fabricated from polyvinyl alcohol, starches, proteins such as collagen, alginates and the like.

While the present invention has been described in some detail and set forth with particularity, it should be understood that modifications, changes and alterations can be made therein without departing from the scope and spirit of the invention.

What is claimed is:

1. An apparatus for moisturizing shirred casing sticks comprising, in combination:
   (a) a reciprocating frame assembly for reciprocating a shirred casing stick positioned thereon;
   (b) a hollow, tubular mandrel having a spray nozzle at one end over which a shirred casing stick can be sheathed;
   (c) means for reciprocating said frame assembly so that said shirred casing stick mounted thereon is reciprocated about said mandrel;
   (d) means for pumping water through said hollow, tubular mandrel and said spray nozzle as said shirred casing stick is sheathed thereover such that the inner surface of said shirred casing stick becomes wetted and moistened; and,
   (e) means for removing a wetted and moistened shirred casing stick from the apparatus.

2. The apparatus of claim 1 wherein means is provided to stop the water from being pumped through said hollow, tubular mandrel and said spray nozzle just prior to the time a shirred casing stick is removed therefrom.

3. The apparatus of claim 2 wherein means is provided to draw a vacuum on said spray nozzle when said water is stopped from being pumped therethrough.

4. An apparatus for moisturizing shirred casing sticks comprising, in combination:
   (a) a hollow, tubular mandrel having a spray nozzle at one end thereof, said hollow tubular mandrel forming an integral part of and associated with the shirring mandrel of a shirring apparatus;
   (b) means associated with said hollow, tubular mandrel for doffing a shirred casing stick therefrom;

(c) means for pumping water through said hollow, tubular mandrel and said spray nozzle as a shirred casing stick, passes over said mandrel during doffing therefrom, such that the inner surface of said shirred casing stick becomes wetted and moistened;

(d) means for stopping the water from being pumped through said hollow, tubular mandrel and said spray nozzle just prior to the time a shirred casing stick is completely doffed therefrom.

5. The apparatus of claim 4 wherein a cylindrical spray sleeve means is positioned over a part of and in alignment with said hollow, tubular mandrel, said cylindrical spray sleeve means being equipped with means to pump water therethrough.

6. The apparatus of claim 4 wherein means is provided to draw a vacuum on said spray nozzle when said water is stopped from being pumped therethrough.

7. An apparatus for moisturizing shirred casing sticks comprising, in combination:
  (a) a support stand mounted to a reciprocating frame assembly for transporting and conveying the open end of a shirred casing stick to and away from a wetting member;
  (b) means for supplying said wetting member with water as said casing stick is conveyed to said wetting member;
  (c) means for contacting said shirred casing stick with water from said wetting member as it is conveyed away from said wetting member until said shirred casing stick is wetted and moistened; and,
  (d) means for removing the thusly wetted and moistened shirred casing stick from the apparatus.

References Cited

UNITED STATES PATENTS

| | | | |
|---|---|---|---|
| 1,938,070 | 12/1933 | Friedler | 99—175 X |
| 2,485,957 | 10/1949 | Cresswell. | |
| 3,112,517 | 12/1963 | Ives. | |
| 3,222,192 | 12/1965 | Arnold | 99—176 |
| 3,280,629 | 5/1966 | Turbak | 99—176 |
| 3,451,827 | 6/1969 | Bridgeford | 99—176 |
| 3,462,794 | 8/1969 | Martinek | 99—176 X |
| 1,989,562 | 1/1935 | Smith | 134—131 X |
| 2,207,697 | 7/1940 | Kendall | 134—68 X |
| 2,316,159 | 4/1943 | Evett | 134—68 X |
| 3,456,286 | 7/1969 | Martinek | 99—176 X |

FRANK W. LUTTER, Primary Examiner

R. HALPER, Assistant Examiner

U.S. Cl. X.R.

99—176; 134—68, 152